(12) United States Patent
Matsumoto

(10) Patent No.: US 8,259,363 B2
(45) Date of Patent: Sep. 4, 2012

(54) IMAGE PROCESSING APPARATUS AND PRINTING APPARATUS

(75) Inventor: Hideto Matsumoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 799 days.

(21) Appl. No.: 12/041,090

(22) Filed: Mar. 3, 2008

(65) Prior Publication Data

US 2008/0212132 A1 Sep. 4, 2008

(30) Foreign Application Priority Data

Mar. 2, 2007 (JP) .................................. 2007-053488

(51) Int. Cl.
*H04N 1/387* (2006.01)
(52) U.S. Cl. .................. 358/453; 358/452; 358/462
(58) Field of Classification Search .................. 358/453, 358/452, 462
See application file for complete search history.

(56) References Cited

U.S. PATENT DOCUMENTS

| 5,201,011 A | * | 4/1993 | Bloomberg et al. .......... 382/175 |
| 5,745,664 A | | 4/1998 | Nomura et al. | |
| 2005/0213174 A1 | | 9/2005 | Maki et al. | |
| 2006/0170968 A1 | | 8/2006 | Maki et al. | |
| 2006/0187477 A1 | | 8/2006 | Maki et al. | |
| 2006/0291000 A1 | | 12/2006 | Maeda et al. | |

FOREIGN PATENT DOCUMENTS

| CN | 1885899 A | 12/2006 |
| JP | H07-143330 A | 6/1995 |
| JP | 2003237169 A | 8/2003 |
| JP | 2004-358714 A | 12/2004 |
| JP | 2005244736 A | 9/2005 |

OTHER PUBLICATIONS

Japan Patent Office; Notification of Reasons for Refusal in Japanese Patent Application No. 2007-053488 (counterpart to the above-captioned U.S. patent application) mailed Mar. 11, 2009.

* cited by examiner

*Primary Examiner* — Twyler Haskins
*Assistant Examiner* — Michael Burleson
(74) *Attorney, Agent, or Firm* — Baker Botts L.L.P.

(57) ABSTRACT

An image processing apparatus includes an image reading unit that reads an image, the image comprising an image printed on a printing sheet, and a first demarcation line added by a writing tool and demarcating a region of the image, a demarcation line extracting unit that extracts the first demarcation line from the image read by the image reading unit, and an image extracting unit that extracts the region of the image demarcated by the first demarcation line from the image as an extracted image.

16 Claims, 27 Drawing Sheets

IMAGE PROCESSING APPARATUS AND PRINTING APPARATUS

CROSS-REFERENCE TO RELATED APPLICATIONS

This application claims priority from Japanese Patent Application No. 2007-053488 filed on Mar. 2, 2007, the entire subject matter of which is incorporated herein by reference.

TECHNICAL FIELD

Aspects of the present invention relate to an image processing apparatus and a printing apparatus.

BACKGROUND

Acts of editing image data, synthesizing a plurality of images, and synthesizing image information and character information and thereafter printing the information onto a printing medium are presently carried out by general users. Printing of greeting cards, printing of diverse labels, etc., can be cited as examples. A personal computer is generally used to edit the image data.

There has been proposed a related art printing apparatus, having an external storage medium slot, where the related art printing apparatus is capable of reading and printing image data from the external storage medium. However, such a system is presently not capable of performing image editing tasks. It would be advantageous to implement a system, using only a printing apparatus to perform image editing and printing, i.e., without the need for connecting to a personal computer. In such a system, if key input operations, mouse operations, etc., are avoided as much as possible, an impression that the system is easy to use for customer groups having a latent distaste for operations unique to digital technologies can be enhanced and convenience can be improved.

Japanese Patent Application No. JP-A-2005-244736 describes a related art system, with which a user enters printing conditions in a printed order sheet that is separate from the image to be printed and describes generally the conditions of the printing, the order sheet is read by a scanner, and a synthesized image is printed according to the designated conditions.

SUMMARY

Aspects of the present invention relate to an apparatus enabling editing and synthesizing of images to be executed easily.

BRIEF DESCRIPTION OF THE DRAWINGS

FIG. 24 is a view of printing onto a postcard;

DETAILED DESCRIPTION

<General Overview>

Figure 1:
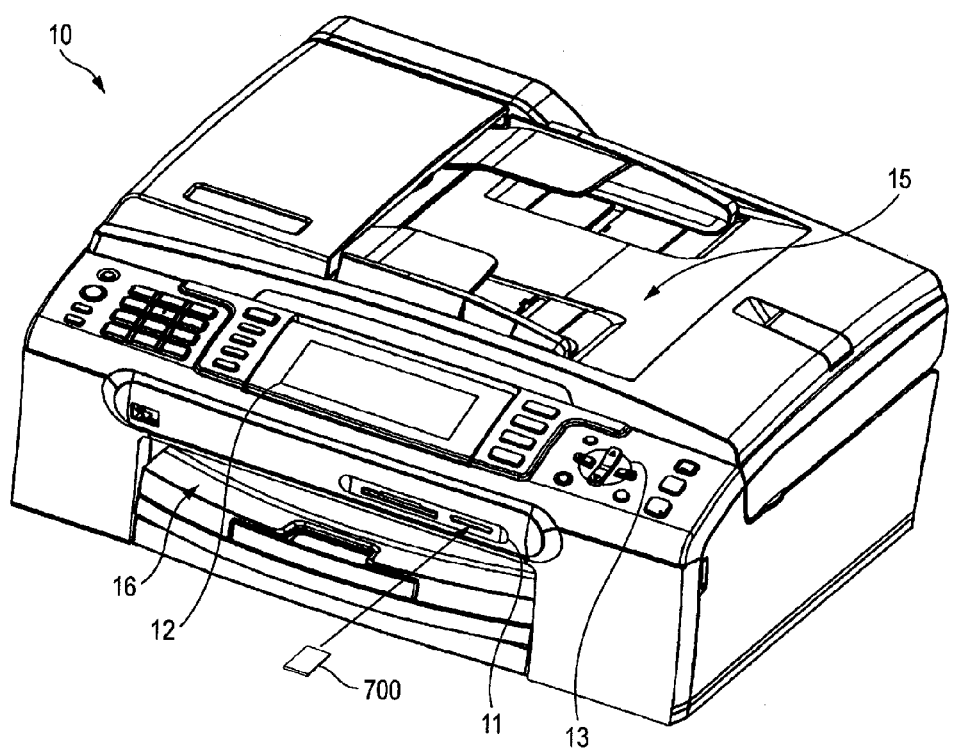
FIG. 1 is an exemplary perspective view of an image processing apparatus.

According to an aspect of the present invention, there is provided an image processing apparatus including: an image reading unit that reads an image, the image including an image printed on a printing sheet, and a first demarcation line added by a writing tool and demarcating a region of the image; a demarcation line extracting unit that extracts the first demarcation line from the image read by the image reading unit; and an image extracting unit that extracts the region of the image demarcated by the first demarcation line from the image as an extracted image.

According to another aspect of the present invention, there is provided an image processing apparatus including: a first storage unit that stores image information; an original image printing unit that prints the image information stored in the first storage unit as an original image onto a printing sheet; an image reading unit that reads an image, the image including the original image printed by the original image printing unit, and a first demarcation line added by a writing tool and demarcating a region of the original image; a demarcation line extracting unit that extracts the first demarcation line from the image read by the image reading unit; and an image extracting unit that extracts the region of the image demarcated by the first demarcation line as an extracted image.

According to still another aspect of the present invention, there is provided a printing apparatus including: a printing unit; and an image processing apparatus, the image processing apparatus including: a first storage unit that stores image information; an original image printing unit that prints the image information stored in the first storage unit as an original image onto a printing sheet; an image reading unit that reads an image, the image including the original image printed by the original image printing unit, and a first demarcation line added by a writing tool and demarcating a region of the original image; a demarcation line extracting unit that extracts the first demarcation line from the image; and an image extracting unit that extracts the region of the image demarcated by the first demarcation line from the image as an extracted image, wherein the printing unit prints the extracted image extracted by the image processing apparatus onto a printing medium.

According to still another aspect of the present invention, there is provided an image processing method including: printing image information as an original image onto a printing sheet; reading an image, the image including the printed original image and a first demarcation line added by a writing tool and demarcating a region of the original image; extracting the first demarcation line from the read image; and extracting the region demarcated by the first demarcation line from the read image.

Illustrative Embodiments

Embodiments of the present invention will be described with reference to the drawings.

In the related system disclosed in JP-A-2005-244736, the positioning of an image is restricted to patterns that have been designated in advance, and a user must make a selection from among these patterns. Thus, positioning of an image is less flexible.

Illustrative embodiments of the present invention relate to an apparatus enabling editing and synthesizing of images to be executed easily.

First Embodiment

A first embodiment according to the present invention shall now be described with reference to the drawings. First, an outer appearance of an image processing apparatus used in the present invention is shown in a perspective view in FIG. 1.

In regard to the image processing apparatus 10, shown in FIG. 1, only principal components relevant to the present invention shall be described. The image processing apparatus 10 is equipped with an external storage medium slot 11. By insertion of an external storage medium 700 (first storage unit) in the slot 11, transfer of data between the external storage medium 700 and the image processing apparatus 10 is enabled. In addition, image data can also be taken in from printed matter by means of a scanner unit 15. Various information are displayed on a display unit (LCD) 12. A user performs various input operations using an input unit 13. In addition, the user sets printing media on a printing tray 16.

Figure 2:
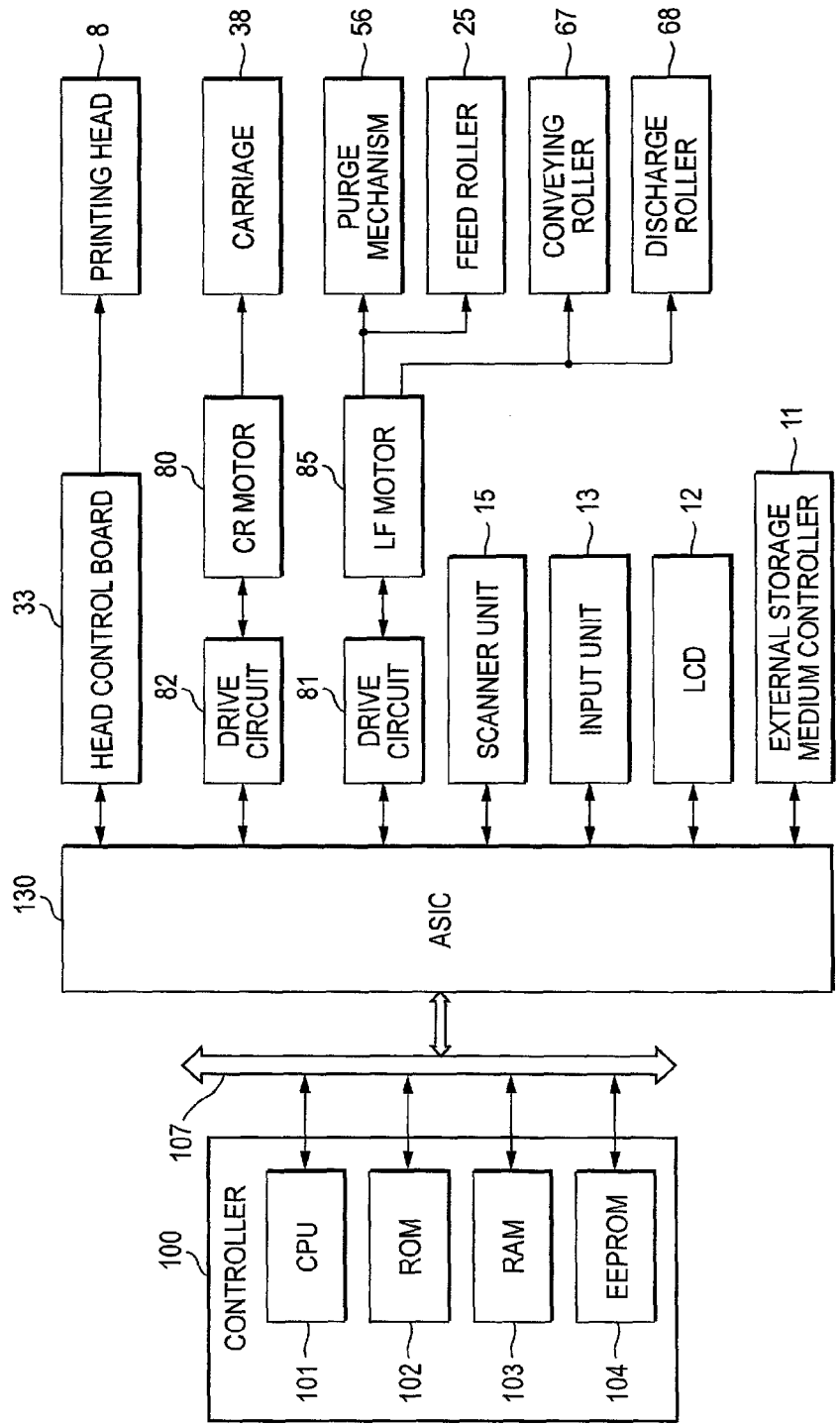
FIG. 2 is an exemplary block view of principal internal components of the image processing apparatus.

FIG. 2 shows a principal internal arrangement of the image processing apparatus 10. As shown in this figure, the image processing apparatus 10 has a controller 100 and an ASIC 130 connected by a bus 107. In addition, the controller 100 includes a CPU 101, a ROM 102, a RAM 103, and an EEPROM 104. The ASIC 130 is connected to and performs exchange of information with respective components of the image processing apparatus 10. These components include a head control board 33, a printing head 8, drive circuits 81 and 82, a carriage 38, performing printing, a CR motor 80 for moving the carriage, a purge mechanism 56, purging ink, a feed roller 25, a conveying roller 67, and a sheet discharge roller 68 that are involved in conveying of sheets, an LF motor 85 for moving the rollers, the scanner unit 15, the input unit 13, the LCD 12, and an external storage medium controller 11.

Figure 27:
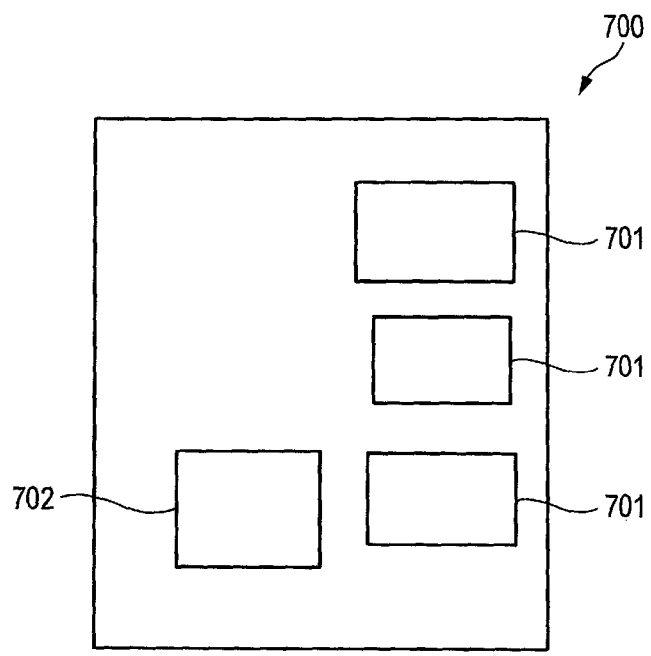
FIG. 27 is an exemplary view of an external storage medium.

With the present embodiment, it is intended that a user edit and print an image on a printing medium selected by the user. An image (original image) 701 used in this process is stored, as shown in FIG. 27, in the external storage medium 700 owned by the user. After the image 701 is taken into the image processing apparatus 10, a region to be printed is designated within the image 701 and is adjusted to suit a size of the printing medium. Furthermore, a character string, stored in the external storage medium 700, is taken in and thereafter synthesized with the adjusted image data and a synthesized image is printed on the printing medium.

With the present embodiment, first, the user sets the image processing apparatus 10 to an image editing and printing mode. This is performed using the input unit 13. A subsequent overall process flow of the present embodiment is shown in a flowchart in FIG. 3. The overall flow is constituted of a printing medium selection step S0, an image selection and draft printing step S100, a draft-image-with-demarcation-line intake step S200, a demarcation line extraction and correction step S300, a character string selection step S400, an image synthesizing step S500, and an image printing step S600. Flows of more detailed processes of the respective steps are shown in FIGS. 4 to 9. These shall be described sequentially below.

A first procedure is the printing medium selection step S0. Printing media that can be used in the image editing and printing mode are stored in advance in the printing apparatus, and these are displayed sequentially on the LCD 12 in the present procedure. The user uses the input unit 13 to select a single printing medium from among those displayed. Examples of the printing media include "CD/DVD," "postcard," etc. In addition, a method where a plurality of printing regions are set up for a single medium may also be employed. In this case, combinations of printing medium and printing region are made to be displayed on the display unit 12. For example, "CD/DVD entirety," "CD/DVD upper half," "postcard vertical, entirety," "postcard horizontal, right half," etc,. are displayed and a user selects a desired printing medium and printing region from among these. In the following, a case where a CD/DVD is selected as the printing medium and an entirety of a label surface of the CD/DVD is selected as the printing region shall be described.

Figure 4:
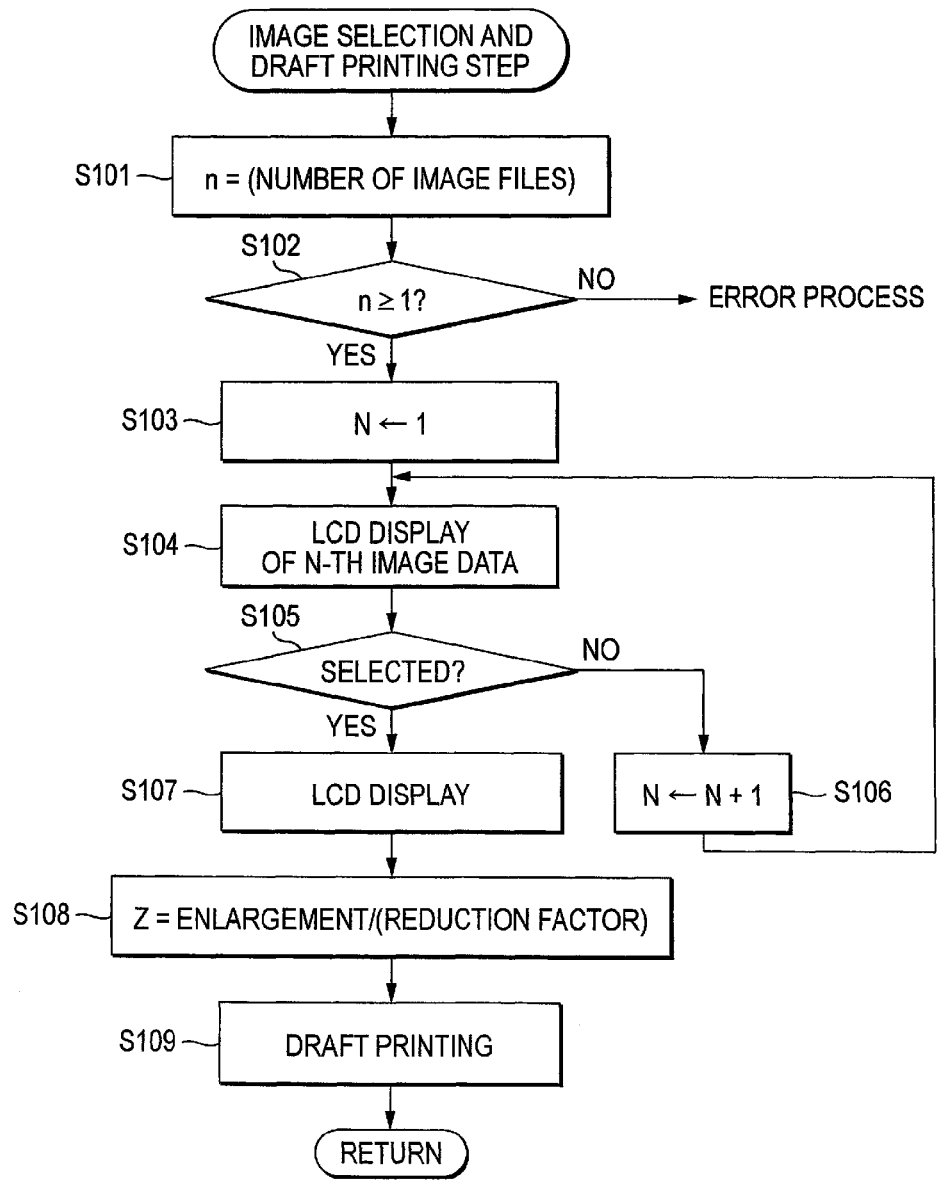
FIG. 4 is an explanatory view of a process flow of an image selection and draft printing step.
Figure 5:
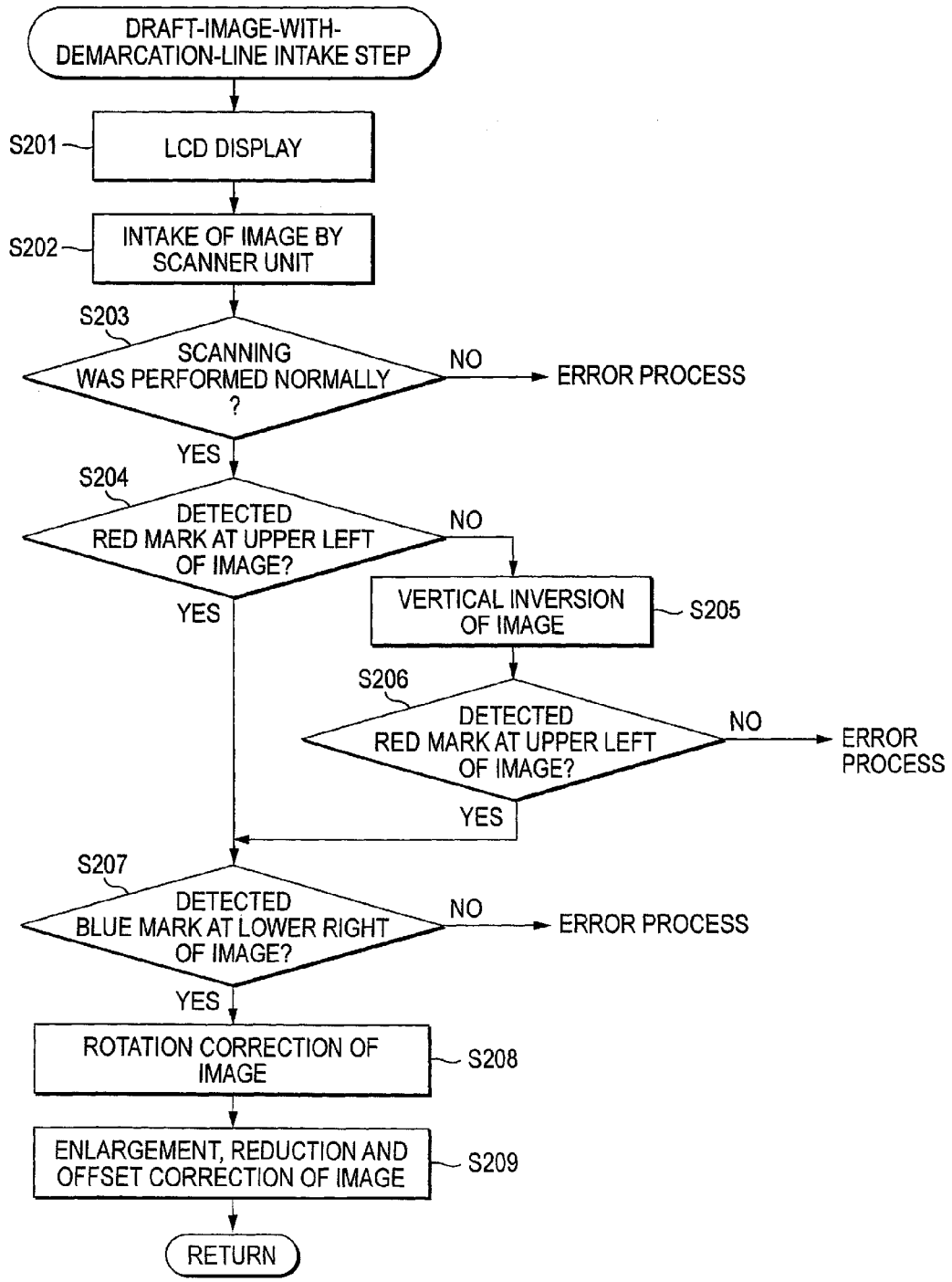
FIG. 5 is an explanatory view of a process flow of a draft-image-with-demarcation-line intake step.

The flow of the image selection and draft printing step S100, which is the first procedure, is shown in FIG. 4. In a first process of S101, one or a plurality of image data (image files) 701, in the external storage medium 700 installed in the external storage medium slot 11, is or are detected and the number of the files is stored in a variable n. The embodiment may be such that an image file format is designated in advance. Or, all image files that can be processed by the image processing apparatus 10 may be handled. Next, in procedure S102 that follows, the value of n is checked, and if this is 0 (S102=No), an error process is entered. In the error process in this case, "An image file is not detected. Please install a medium in which an image file is stored." is displayed on the LCD 12 and a return to S101 is performed. If n is 1 or more in S102 (S102=Yes), the next procedure is entered.

In the next procedure, the image data 701 in the medium 700 are displayed one by one on the LCD 12. A variable N is set to 1 in S103, and an N-th image data is displayed on the LCD 12 in S104. In S105, it is determined whether or not to select the image currently being displayed on the LCD 12. This is performed using the input unit 13. For example, buttons for selection and non-selection may be set up and a selection may be made by the user performing a button operation. When a selection is made, the currently displayed image is stored as the selected image in the main storage unit (second storage unit, RAM) 103 of the image processing apparatus 10. If an image is not selected, N is incremented by 1 in S106 and the next image in the medium is displayed on the LCD 12. This procedure is repeated until a single image is selected by the user.

Figure 10:
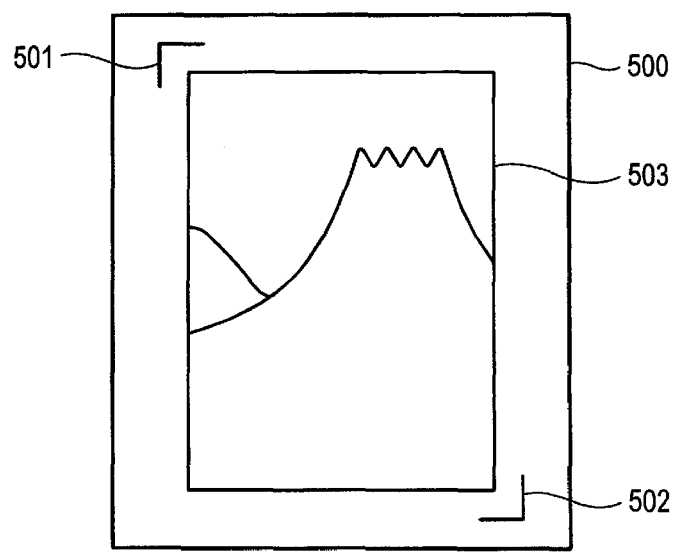
FIG. 10 is an exemplary view of a printing sheet on which draft printing has been performed.

When image selection by the user is completed, "This image shall be printed." is immediately displayed on the LCD 12 in procedure S107 and draft printing of the selected image is performed. The size of the printing sheet is set in advance. With the present embodiment, the image shall be printed on an A4 size sheet. An A4 size printing sheet 500 is shown in FIG. 10, and a region 503 therein is the region in which the selected image is printed. The selected image is automatically enlarged or reduced to be printed at a suitable size in the region. An enlargement/reduction factor in this process is stored in a variable Z in S108. In S109, functioned as original image printing unit, draft printing is performed. In the draft printing of S109, marks 501 and 502, shown in FIG. 10 are printed on the A4 sheet. The marks 501 and 502 are printed in predetermined colors. In the present embodiment, the mark 501 is red and the mark 502 is blue. These are used for image position ascertainment, etc., that are performed subsequently. The above is the flow of the image selection and draft printing step S100.

Next, the draft-image-with-demarcation-line intake step S200 is entered in the present embodiment. That is, a writing tool of a first color, for example, red is used to draw, on the printing sheet on which the draft printed image has been printed, a region of the draft image that is desired to be cut out, and a writing tool of blue or other second color different from the first color is used to draw a region, in which a character string is desired to be placed, within the demarcated region of the first color. In this procedure, first, in S201, "Surround a region in the printed image that is to be used for the CD label with a red circle, surround a region in which a title or other characters are to be printed with blue, set the sheet on the scanner, and press the key." is displayed on the LCD 12.

In addition, the draft printing in the present embodiment may be changed to monochromatic printing. In this case, the first color and the second color may be colors that differ mutually and differ from the color used in the monochromatic printing.

Moreover, an embodiment where the printing is performed neither as draft printing nor as monochromatic printing is also possible. In this case, the first color and the second color are set as colors that differ from those of other portions of the image taken in by the scanner.

Figure 11:
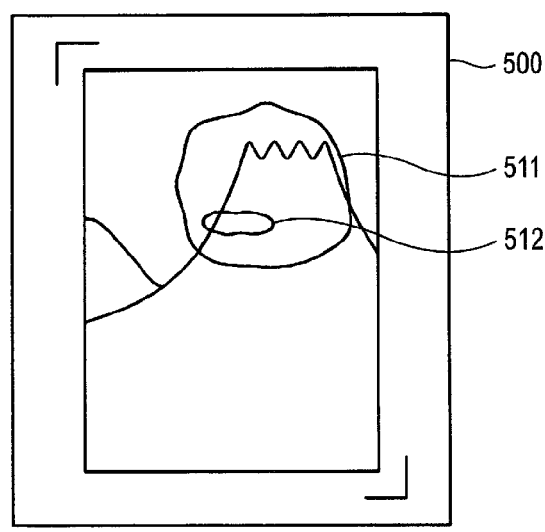
FIG. 11 is an exemplary view of the sheet of FIG. 10 on which hand-drawn demarcation lines have been drawn.

In accordance with the displayed instructions, the user uses the writing tools to draw a red, circular demarcation line and a blue demarcation line on the A4 printing sheet on which the selected image has been draft printed. The blue demarcation line must be drawn inside the red circular demarcation line. These demarcation lines may be hand-drawn and may be distorted. The hand-drawn demarcation lines are corrected to a perfect circle and a rectangle in a subsequent process. FIG. 11 shows an example of a state after hand-drawn demarcation lines have been drawn on the draft printed sheet. A hand-drawn, circular demarcation line 511 and another demarcation line 512 are drawn in the image. In accordance with the instructions, 511 is drawn in red and 512 is drawn in blue. The description shall now be continued in regard to the sheet 500 of FIG. 11.

Next, the user sets the sheet 500, on which the two demarcation lines have been drawn as described above, on the scanner unit 15 of the image processing apparatus 10. By then performing a scanning starting input, intake of an image (image with demarcation lines) by the scanner unit 15 of procedure S202 (image-with-demarcation-line reading unit) is started. After the end of scanning, S203 is entered, and whether or not scanning was performed normally is checked. If it is determined here that scanning was not performed normally (S203=No), an error process is entered. As the error process in this case, a request to perform scanning again is displayed on the LCD 12. If it is determined in S203 that scanning was performed normally (S203=Yes), S204 is entered and it is checked whether or not the red mark 501 at the upper left of the image is detected. If the red mark 501 is detected, S207 is entered. If the red mark 501 is not detected, because this means that the sheet was scanned upside down, a vertical inversion of the image is performed in the image processing apparatus 10 in S205.

Figure 12:
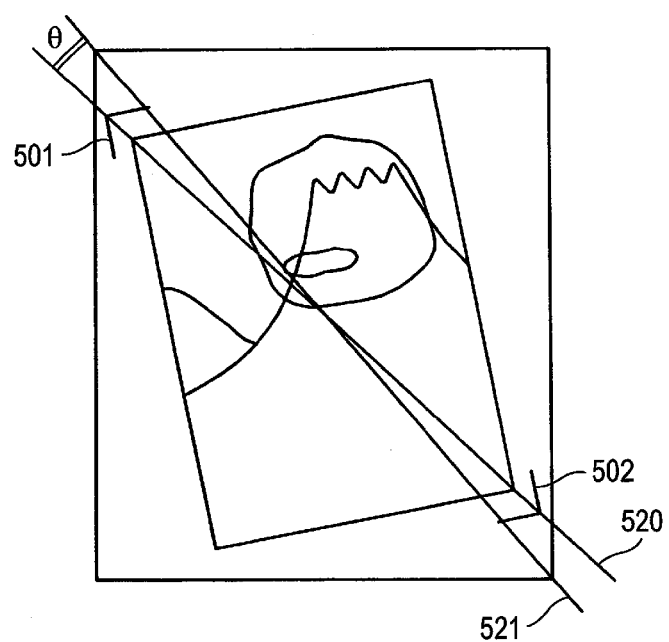
FIG. 12 is a view for describing rotational correction of an image.

S206 is then entered and it is checked again whether or not the red mark 501 at the upper left of the image is detected. If the red mark 501 is detected, S207 is entered. If the red mark 501 is not detected again, an error process is performed and rescanning is requested. In S207, it is checked whether or not the blue mark 502 at the lower right of the image is detected. Whereas if the blue mark 502 is not detected, the error process is performed again, if the blue mark 502 is detected, S208 is entered. In S208, rotational correction of the image is performed. In this process, a straight line 520, connecting respective corner points of the red mark 501 and the blue mark 502, is formed in a virtual space as shown in FIG. 12. An angle θ, between a diagonal line 521 for a case where there is no tilt and the straight line 520 is calculated. The image is then rotated by just θ.

Next, in S209, enlargement, reduction, and parallel movement of the image are applied to make the red mark 501 and the blue mark 50 in the image be positioned at exactly the same positions as those of the image during draft printing. As a result of the above procedures, image data that can be regarded as being the same as the A4 sheet 500, shown in FIG. 11, is formed in the virtual space of the image processing apparatus 10 or in the main storage unit 103. The above is the flow of the draft-image-with-demarcation-line intake step S200.

Figure 6:
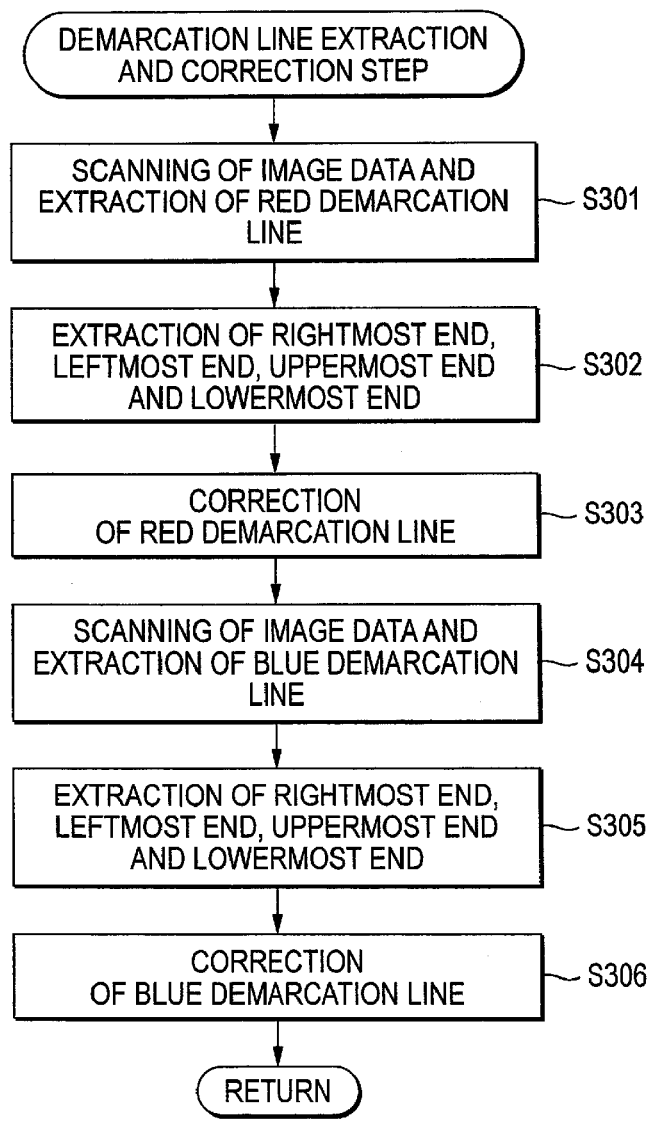
FIG. 6 is an explanatory view of a process flow of a demarcation line extraction and correction step.

The demarcation line extraction and correction step S300 shall now be described. This is illustrated in FIG. 6. In this procedure, first in S301 (demarcation line extracting unit), the image data is scanned in the virtual space and the demarcation line (first demarcation line) 511 of the first color (red) is extracted. This is performed by scanning the image data vertically and to the left and right and recognizing that a point of red color that is detected first is a point on the red demarcation line. Upon this process, determination conditions for determining whether or not a color of a point is red are set in advance. Because color recognition by the setting of the determination conditions belongs within a scope of conventional arts, description thereof shall be omitted. In addition, because the range that is scanned is limited to the interior of the region 503, the red demarcation line 511 is not confused with the red mark 501. In addition, the blue demarcation line 512, to be described below, is also not confused with the blue mark 502.

Figure 13:
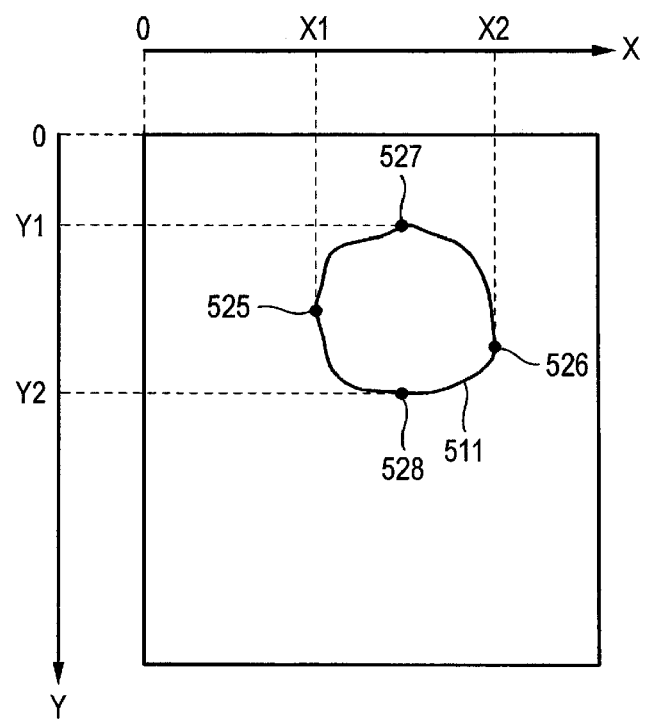
FIG. 13 is a view for describing an extracted demarcation line.

With the present invention, correction of the hand-drawn demarcation line 511 is performed next. Because printing of a CD/DVD label is intended in the present embodiment, the red demarcation line 511 is corrected to a perfect circle. In the present embodiment, correction by a simple method described below is performed. This shall now be described using FIG. 13. In FIG. 13, portions of the image data besides the red demarcation line 511 are omitted. For the description that follows, an X-axis, which is an abscissa in the image data in the virtual space, and a Y-axis, which is an ordinate, are set as shown in FIG. 13.

In the procedure of extracting the demarcation line 511, although an embodiment where all points of the demarcation line are extracted is possible, an embodiment where fewer points are extracted shall be described below. In this embodiment, just an X-coordinate of a rightmost end of the red demarcation line 511, an X-coordinate of a leftmost end, a Y-coordinate of an uppermost end, and a Y-coordinate of a lowermost end are extracted. Specifically, this is performed, for example, in a case of extracting the X-coordinate of the leftmost point, by performing scanning from a left side of the image data sequentially from an upper row (side of small Y-coordinate value), setting an X-coordinate of a point, extracted first as a red point, as a minimum X-coordinate value, and repeating replacement of the minimum value if an X-coordinate of a point extracted in the scanning of the next row is less than the previously determined minimum value. An X-coordinate X1 of a point 525 is thereby extracted in the case of FIG. 13. This is the X-coordinate of the leftmost end of the red demarcation line 511.

By scanning from the right, upper, and lower sides by the same procedure, an X-coordinate of a point 526, a Y-coordinate of a point 527, and a Y-coordinate of a point 528 in FIG. 13 are extracted. The X-coordinate of the point 526 is set as X2, the Y-coordinate of the point 527 is set as Y1, and the Y-coordinate of the point 528 is set as Y2. X2 is the X-coordinate of the rightmost end of the red demarcation line 511, Y1 is the Y-coordinate of the uppermost end of the red demarcation line 511, and Y2 is the Y-coordinate of the lowermost end of the red demarcation line 511. The leftmost end, rightmost end, uppermost end, and lowermost end of the red demarcation line 511 are thus extracted in S302 (image extracting unit).

Figure 14:
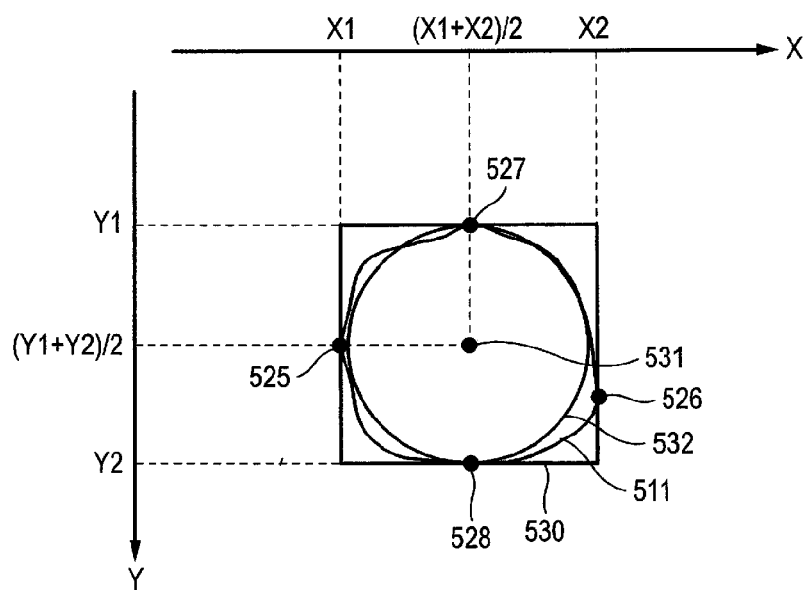
FIG. 14 is a view of correction of a demarcation line to a perfect circle.

Next, correction of the red demarcation line 511 is then performed in S303 functioned as a correcting unit. First, in the virtual space, a rectangle that circumscribes the hand-drawn demarcation line 511 is drawn. This shall be described using FIG. 14. As shown in this figure, a straight line that passes through the leftmost point 525 of the hand-drawn demarcation line 511 and is parallel to the Y-axis is drawn. Likewise, a straight line that passes through the rightmost point 526 and is parallel to the Y-axis, a straight line that passes through the uppermost point 527 and is parallel to the X-axis, and a straight line that passes through the lowermost point 528 and is parallel to the X-axis are drawn. The rectangle surrounded by the above four straight lines is the rectangle 530, shown in FIG. 14. This rectangle 530 is a circumscribing rectangle of the hand-drawn demarcation line 511. Next, a center of gravity of the rectangle is determined. As shown in FIG. 14, this is the point 531, with which an X-coordinate is (X1+X2)/2 and a Y-coordinate is (Y1+Y2)/2. Moreover, a circle that is centered at the point 531 and is inscribed in the rectangle 530 is drawn. The circle 532, shown in FIG. 14, is thereby obtained. With the present embodiment, the circle 532, prepared by the above procedure, is deemed to be the corrected hand-drawn demarcation line 511. The red demarcation line 511 is thereby extracted and corrected.

Figure 15:
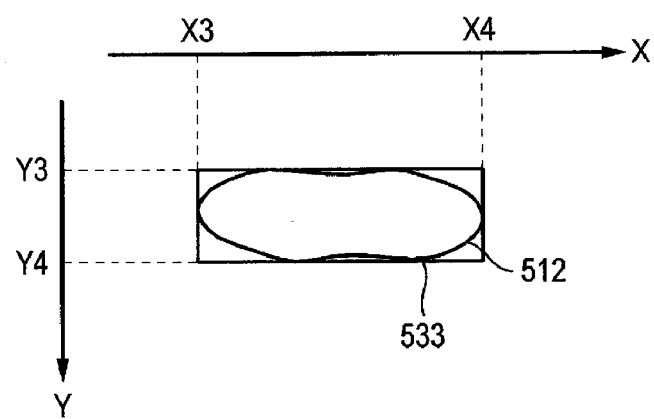
FIG. 15 is a view for describing a correction of a demarcation line to a rectangle.

Next, extraction and correction of the demarcation line (second demarcation line) 512 of the second color (blue) are performed. This shall be described using FIG. 15. The method for extracting the hand-drawn blue demarcation line 512 in S304 is the same as that for extracting the red demarcation line 511. And in S305, coordinates of a leftmost end, rightmost end, uppermost end, and lowermost end (X3, X4, Y3, Y4) are extracted. A circumscribing rectangle 533 is then drawn for the hand-drawn blue demarcation line 512. This procedure is exactly the same as the procedure for drawing the circumscribing rectangle 530 for the hand-drawn demarcation line 511 and is constituted of drawing straight lines that pass through the leftmost, rightmost, uppermost, and lowermost points and are parallel to the X-axis or the Y-axis. In the present embodiment, the circumscribing rectangle 533 is used as the corrected hand-drawn demarcation line 512 as shown in FIG. 15. The demarcation line 512 of the second color (blue) is thus corrected in S306.

Figure 16:
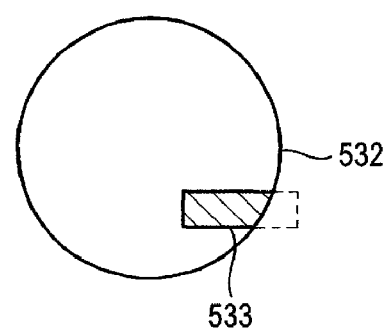
FIG. 16 is a view of a case where demarcation lines after correction overlap.

Due to correction of the two hand-drawn demarcation lines 511 and 512 as described above, a situation may arise where, even though the hand-drawn blue demarcation line 512 is present within the interior of the red demarcation line 511, a portion of the blue demarcation line protrudes outside the red demarcation line after correction. The circumstances are shown in FIG. 16. In such a case, with the present embodiment, a correction of deleting the portion of the corrected demarcation line 533 of the second color that protrudes outside the corrected demarcation line 532 of the first color (the dotted line portion in FIG. 16) is performed. Consequently, the final corrected demarcation line 533 becomes the perimeter line of the slanted-line region in FIG. 16. With the above, step S300 of extracting and correcting the demarcation line 511 of the first color (red) and the demarcation line 512 of the second color (blue) is ended.

Figure 7:
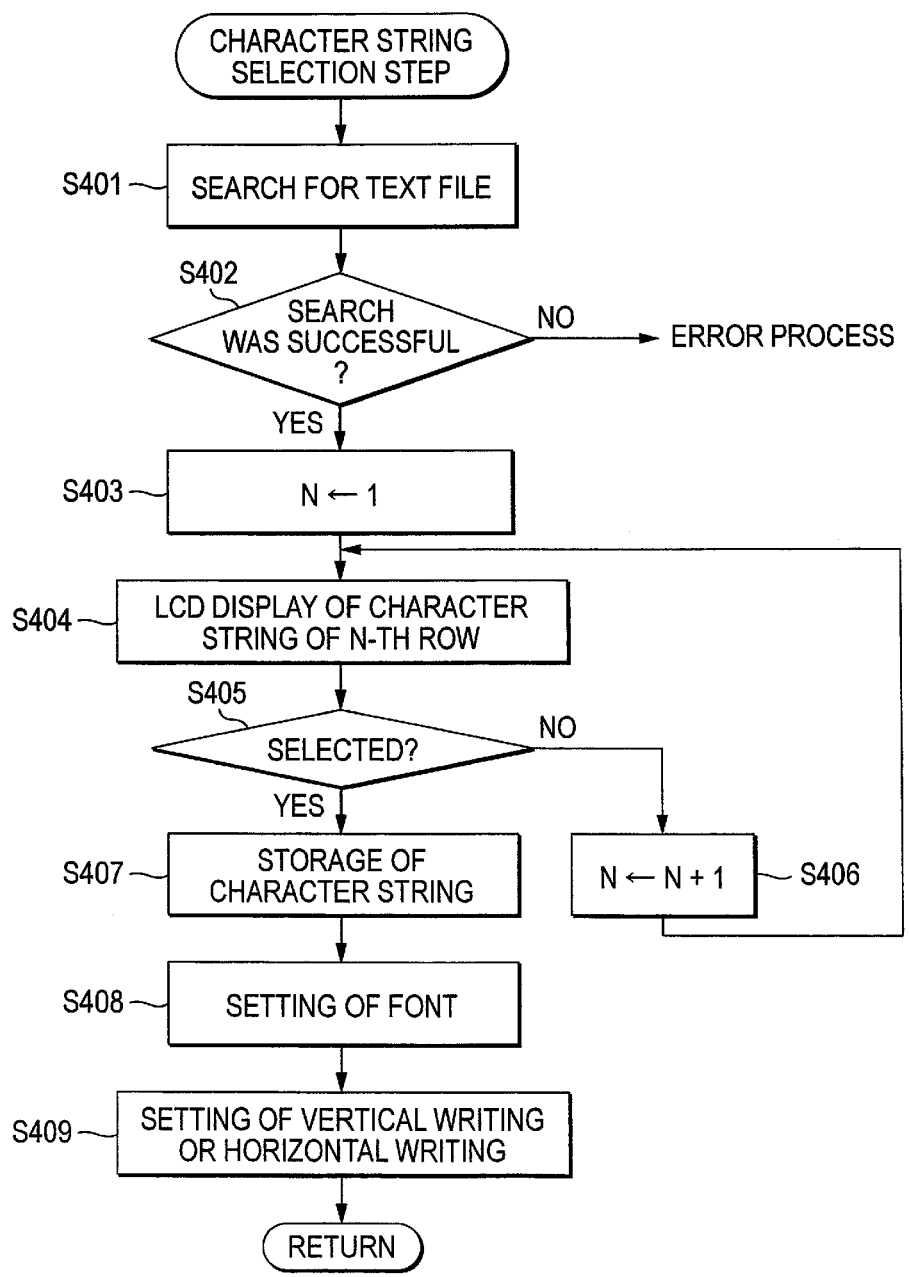
FIG. 7 is an explanatory view of a process flow of a character string selection step.

Next, the character string selection step S400 shall be described. With the present embodiment, a method where character string data 702 is stored in advance in text file format in the external storage medium 700 as shown in FIG. 27 and the user selects this data is employed. This procedure is illustrated in FIG. 7. When step S300 is ended, the image processing apparatus 10 displays, on the LCD 12, a message requesting installation of the external storage medium 700. Then in procedure S401, the presence of the text file 702 in the external storage medium 700 is searched. The name of the text file 702 may be set arbitrarily. With the present embodiment, the name of the text file 702 shall be set to "msg.txt." If the search for msg.txt in S402 succeeds, S403 is entered, and if the search fails, an error process is performed. In the error process in this case, a message requesting the installation of the external storage medium 700 in which the text file msg.txt is stored is displayed on the LCD 12.

When S403 is then entered, the variable N is set to 1, and in S404, a character string of an N-th line in msg.txt, which is the text file 702, is displayed on the LCD 12. A display asking the user whether or not this character string is selected is then displayed on the LCD 12. Then, input to determine whether or not the user should select is performed. Here, for example, operations corresponding to a selection input and a non-selection input by the user are set up in advance in the input unit 13. If the user makes an input indicating that the displayed character string is selected, S407 is entered. If the user makes an input indicating that the character string is not selected, the value of N is incremented by 1 in S406, the display of the next line is performed in S404, and the above procedure is repeated until the user makes an input indicating the selection of the displayed character string.

Next in S407, the character string displayed on the LCD 12 is stored in the main storage unit 103 as the selected character string. A font is set in S408. This may be carried out by a method where the image processing apparatus 10 makes types of usable fonts be displayed one by one on the LCD 12 and the user selects one of these fonts. Furthermore in S409, whether or not to perform printing vertically or printing horizontally is selected. This may also be carried out by a method where the choices of vertical printing and horizontal printing are displayed sequentially on the LCD 12 and the user selects either choice. In addition, for the purpose of constructing a simpler system, a system with which the font and vertical or horizontal printing are determined to a single choice in advance, may also be arranged.

Figure 8:
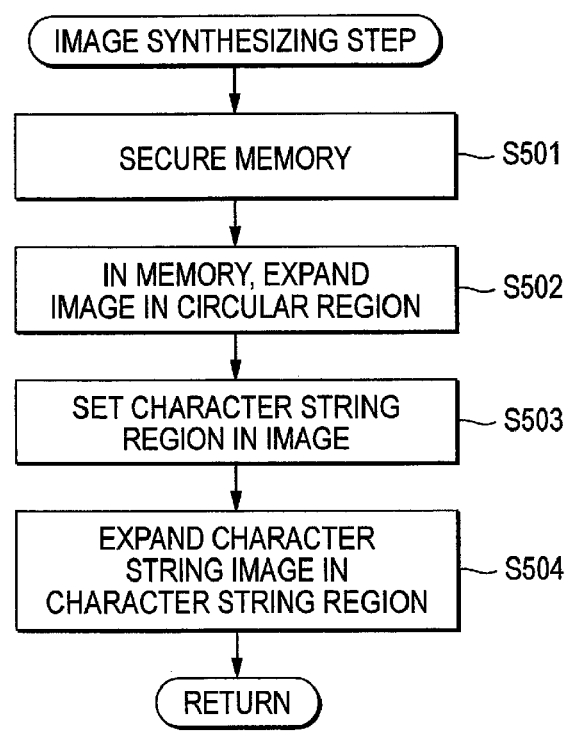
FIG. 8 is an explanatory view of a process flow of an image synthesizing step.

The image synthesizing step S500, functioned as a character string adding unit, shall now be described. This is shown in FIG. 8. First, in S501, a memory for expansion of a synthesized image is secured in the main storage unit 103 of the image processing apparatus 10. Then in S502, original image information, present inside the corrected demarcation line 532 of the first color (red) that has been extracted and corrected in the demarcation line extraction and correction step S300, is cut out and expanded in the memory secured in S501. Here, the image that is cut out may be the image taken in by the scanner after draft printing or may be the original image. A case where the image that is cut out is the original image shall be described.

Next, in S503, a region, formed by the corrected blue demarcation line 533 that has been extracted and corrected in the demarcation line extraction and correction step S300 is set in the image generated in S502. Then in S504, also functioned as the character string adding unit, the character string, selected in S400, is expanded as an image in the region inside the corrected blue demarcation line 533. In this process, rules for determining a size of the characters In accordance with an area of the blue demarcation line and a number of characters are set in advance. By the above procedure, a synthesized image is prepared in which the character string is positioned inside the corrected blue demarcation line in the original image inside the corrected red demarcation line 532. The image synthesizing step S500 is carried out as described above.

Figure 9:
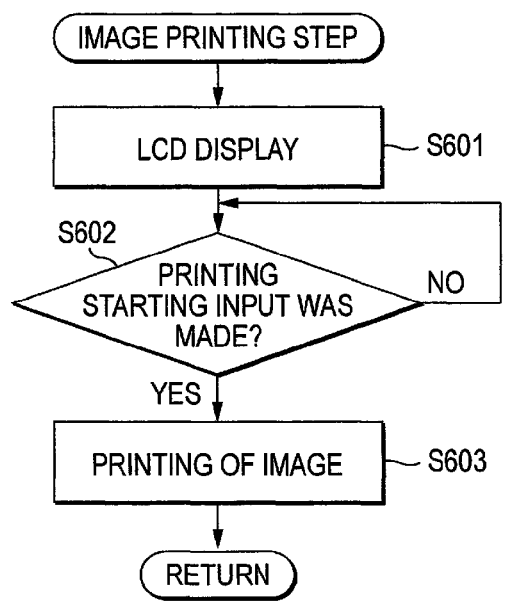
FIG. 9 is an explanatory view of a process flow of an image printing step.
Figure 17:
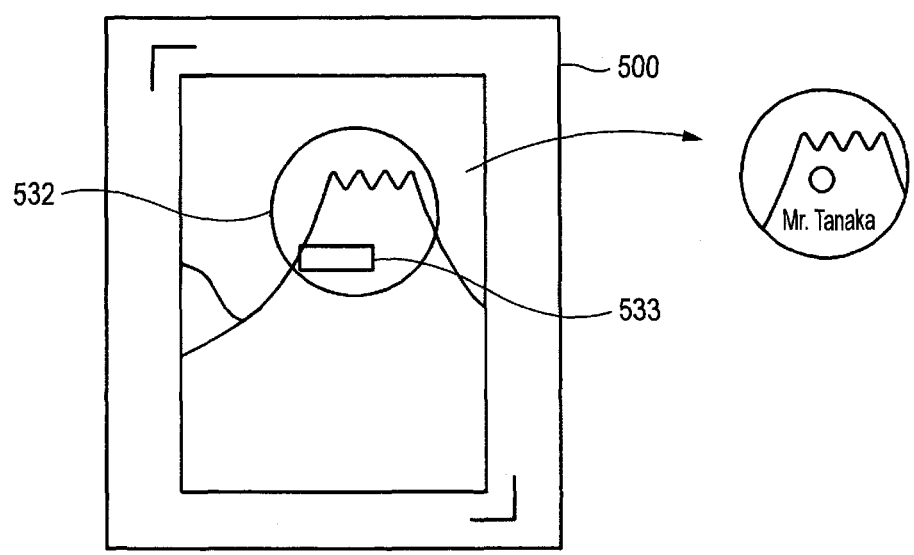
FIG. 17 is a view of printing onto a CD or a DVD.

Next, the image printing step S600, functioned as a printing unit, shall now be described. This step is illustrated in FIG. 9. First, in S601, "Set a CD/DVD on the printing tray and then press a key." is displayed on the LCD 12. An input waiting state is then entered in S602. In this state, the user sets a CD or a DVD on the printing tray 16 of the image processing apparatus 10. When setting is ended, an input is performed by the input unit 13. When there is an input, procedure S603 is entered. In S603, the synthesized image, formed in S500, is printed on a label surface of the CD or DVD. In this process, the enlargement/reduction factor Z, stored in S109, is also used. Consequently by the above procedures, label printing on a CD/DVD is performed as shown in FIG. 17.

In addition, with the present embodiment, the system may be arranged with the omission of procedures S0 and S100. In this case, that there is a printing sheet on which an image is printed becomes a starting point of the processing procedure. The first and second colors are selected from among colors that are not used in the image.

Furthermore with the present embodiment, the system may be arranged with the procedure of correction of the demarcation lines of the first and second colors being omitted. In this case, an image inside a hand-drawn demarcation line is cut out by the system. The system may also be arranged with the omission of S600. In this case, a synthesized image can be stored in the external storage medium 700 and be used at a separate location, etc.

Second Embodiment

Figure 3:
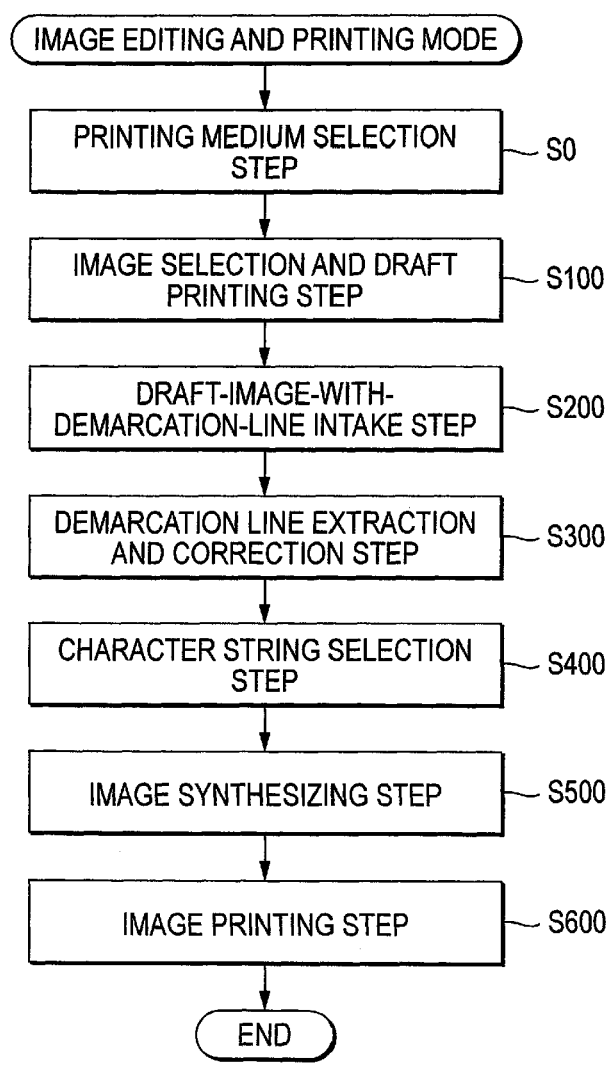
FIG. 3 is an overall process flow view of an embodiment according to the present invention.

A second embodiment according to the present invention shall now be described. With the second embodiment, a case, where an entire rear surface of a horizontally placed postcard of official postcard size is selected as the printing medium and the printing region in the printing medium selection step S0 in FIG. 3, is handled.

Figure 18:
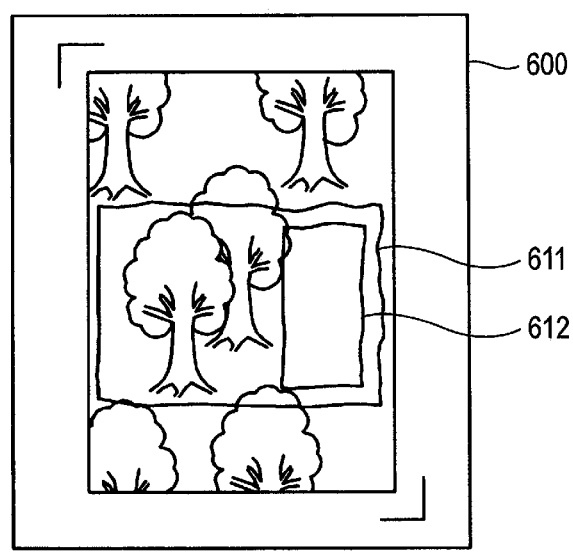
FIG. 18 is a view of a draft printed sheet on which hand-drawn demarcation lines have been drawn.

Because the process flow of the second embodiment is substantially the same as that of the first embodiment, just the portion that differs shall be described. The portion that differs is the demarcation line extraction and correction step S300. This shall be described using FIG. 18. FIG. 18 shows an A4-size printing sheet 600 on which an original image has been draft printed. As with the first embodiment, a sheet size other than A4 may be set in advance. Using writing tools, a user hand-draws a demarcation line 611 of the first color (red) and a demarcation line 612 of the second color (blue) on the sheet. As with the first embodiment, the red demarcation line 611 corresponds to an outer perimeter line of the printing region (here, the entire rear surface of the horizontally placed postcard), and the blue demarcation line 612 is the demarcation line of the region in which a character string is to be positioned. These are extracted and corrected in procedure S300.

Figure 19:
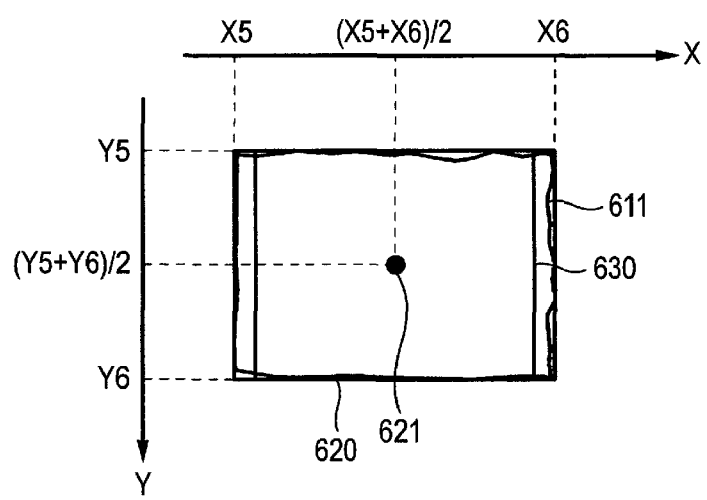
FIG. 19 is a view for describing a correction of a demarcation line to a postcard shape.
Figure 20:
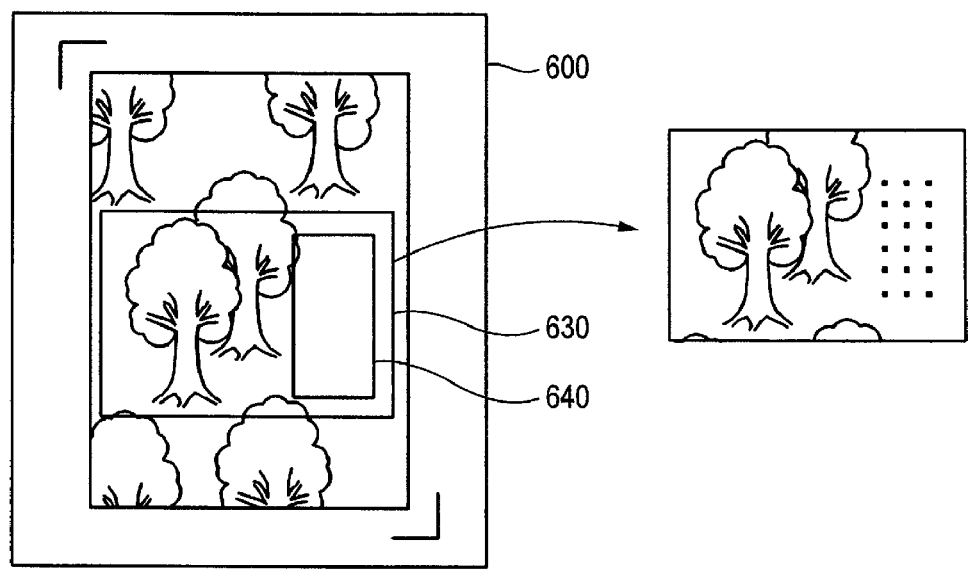
FIG. 20 is a view of printing onto a postcard.

The demarcation line 611 shall now be described using FIG. 19. As with the first embodiment, an X-coordinate X5 of a leftmost end, an X-coordinate X6 of a rightmost end, a Y-coordinate Y5 of an uppermost end, and a Y-coordinate Y6 of a lowermost end are extracted as shown in FIG. 19, and a circumscribing rectangle 620 is determined by these coordinates. With a center of gravity 621 (that is, a point with an X-coordinate of (X5+X6)/2 and a Y-coordinate of (Y5+Y6)/2) of the circumscribing rectangle 620 being matched with a center of gravity of a shape of an official postcard, the shape of the official postcard is enlarged or reduced so as to be inscribed in the rectangle 620. A demarcation line 630 is thereby obtained. This demarcation line 630 is used as the correction result of the hand-drawn red demarcation line 611. The correction of the blue demarcation line 612 is performed in the same manner as the correction of the blue demarcation line 512 in the first embodiment. The rest of the procedure is entirely the same as that of the first embodiment, and correction to a demarcation line 640, shown in FIG. 20, is performed. Consequently, postcard printing is completed as shown in FIG. 20.

With the second embodiment, the system may be changed to an arrangement where vertical placement or horizontal placement of the postcard is not designated in procedure S0 but is determined by a hand-drawn demarcation line as follows. That is, in this case, just "postcard" is selected in procedure S0. Magnitudes of lengths of two sides of the circumscribing rectangle 620 shown in FIG. 19, that is, the magnitudes of the value of X6–X5 and the value of Y6–Y5 are checked, and if the former is greater, a horizontally placed postcard is determined while if the latter is greater, a vertically placed postcard is determined. Settings may be made so that when the two sides are the same in length, either the horizontally placed postcard or the vertically placed postcard is selected.

Third Embodiment

Figure 21:
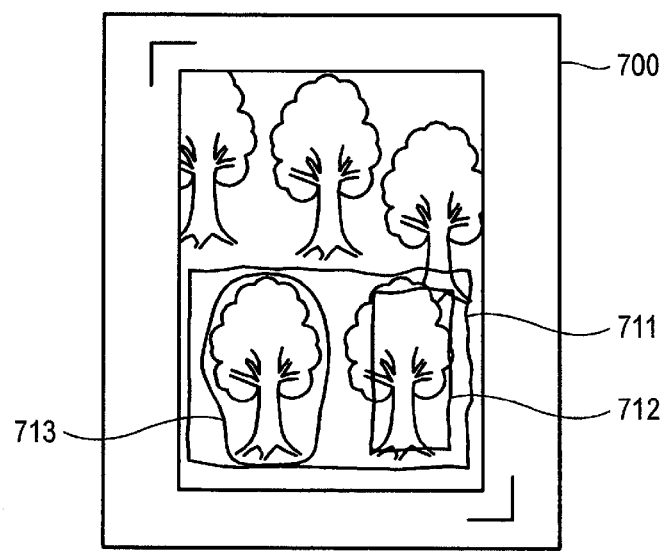
FIG. 21 is a view of a draft printed sheet on which hand-drawn demarcation lines have been drawn.

A third embodiment of the present invention shall now be described using FIG. 21. An entire rear surface of a horizontally placed postcard of official postcard size shall be the printing medium and the printing region with the present embodiment as well. An A4 printing sheet 700, on which an original image is draft printed is shown in FIG. 21. As with the first and second embodiments, the paper size may be set to a size other than A4. A user uses writing tools to draw a demarcation line 711 of a first color (red) and a demarcation line 712 of a second color (blue) on the sheet by hand writing. Furthermore with the third embodiment, the user uses a writing tool to draw, as a third demarcation line, a demarcation line 713 of a third color, for example, green. The green demarcation line 713 is drawn in the interior of the red demarcation line 711. These three demarcation lines are extracted in procedure S300. The demarcation lines 711 and 712 are corrected in the same manner as the demarcation lines 611 and 612 of the second embodiment and respectively corrected to demarcation lines 751 and 752, shown in FIG. 22. Although the system may be arranged to correct the green demarcation line 713, here, the system shall be arranged not to correct this demarcation line in the following description. The green demarcation line 713 is used to trim an image outside the demarcation line 713. Other procedures of the third embodiment are the same as those of the first and second embodiments. Consequently, postcard printing is realized as shown in FIG. 22.

Figure 22:
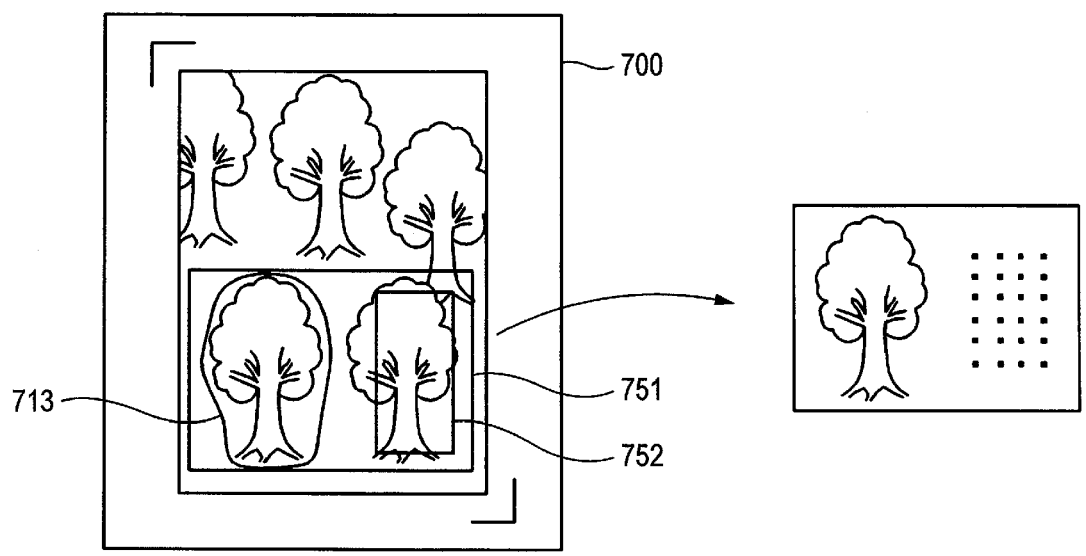
FIG. 22 is a view of printing onto a postcard.

In FIG. 22, just one tree is taken out from an image of a plurality of trees shown in FIG. 21 and printed onto a postcard, and the third embodiment is suited for such a case where an image is not to be printed on the entirety of the printing region but is desired to be printed only on a portion of the printing region. In addition, although correction was not performed on the demarcation line of the third color in the above embodiment, the system may be changed to one in which correction is applied. In addition, as an embodiment for such as case, correction to a circumscribing rectangle can be performed as in the correction of the hand-drawn demarcation line 512 to the circumscribing rectangle 533 shown in FIG. 15. Or, an embodiment where correction is performed to an ellipse inscribed within the four sides of the circumscribing rectangle is also possible. An embodiment is also possible where not just an ellipse, but a plurality of geometric shapes that can be used are stored in advance in the printing apparatus 10, these shapes are displayed one by one on the display unit 12, a user selects one geometric shape from among the displayed shapes, and the geometric shape is enlarged or reduced so as to be inscribed within the four sides of the circumscribing rectangle.

Modified Embodiments

Figure 23:
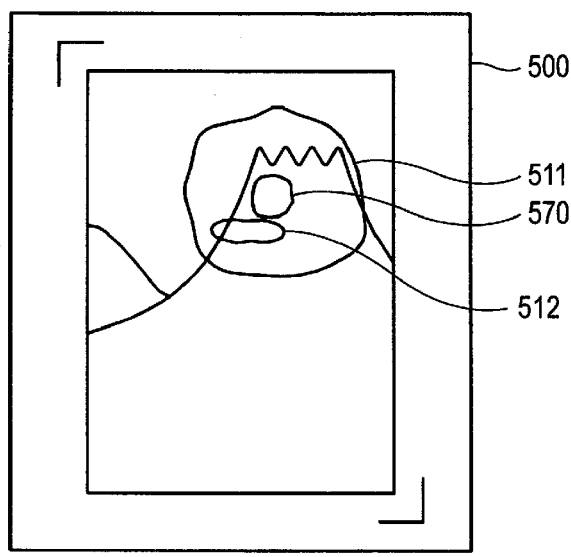
FIG. 23 is a view of a draft printed sheet on which hand-drawn demarcation lines have been drawn.
Figure 24:
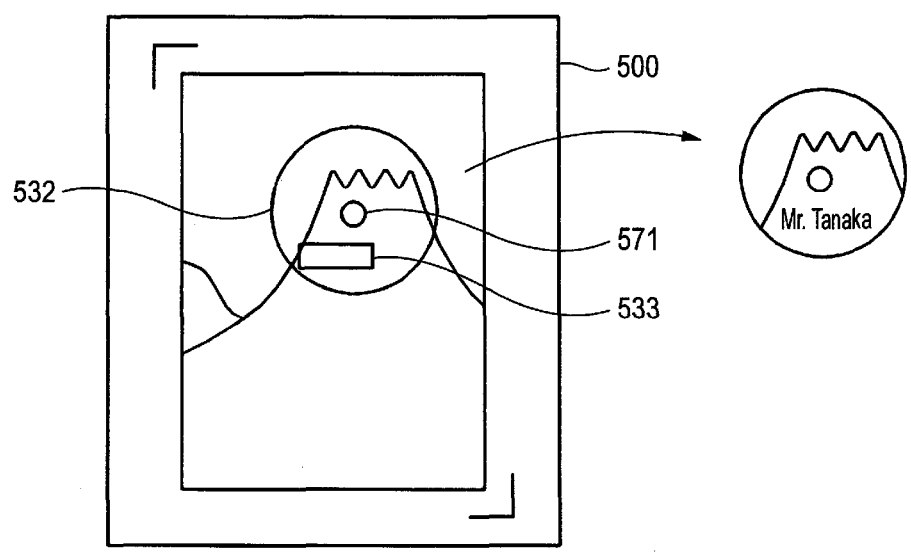
FIG. 24 is a view of printing onto a CD or a DVD.
Figure 25:
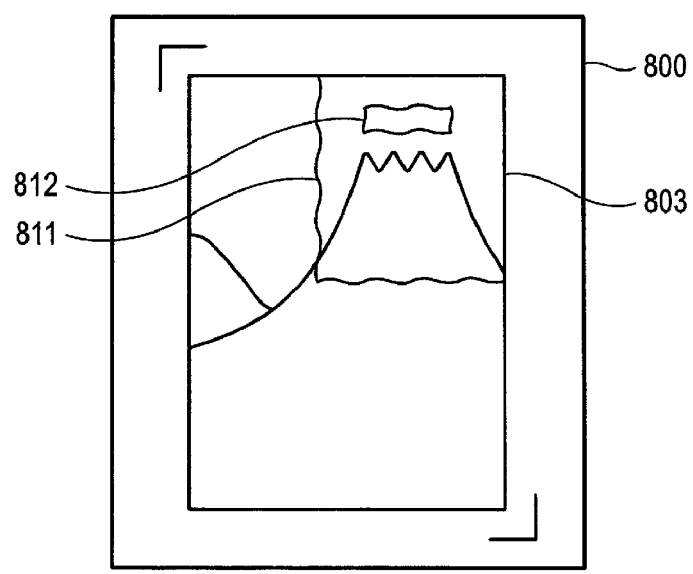
FIG. 25 is a view of a draft printed sheet on which hand-drawn demarcation lines have been drawn.

A modified example of CD/DVD printing of the first embodiment shall now be described. This is illustrated in FIG. 23. In this modified example, in addition to the demarcation line 511 of the first color and the demarcation line 512 of the second color, an auxiliary demarcation line 570 is hand-drawn by the user. The auxiliary demarcation line 570 is a demarcation line corresponding to a circular, non-printing region at a center of a CD/DVD. A boundary of the printing region is formed by the auxiliary demarcation line 570 and the demarcation line 511 of the first color. The color of the auxiliary demarcation line 570 is set to the same color as the demarcation line 511 of the first color. Or, the color of the auxiliary demarcation line 570 may be set to a color that differs from those of the demarcation lines of the first color and the second color (and furthermore that of the demarcation line of the third color). Demarcation line extraction is performed in the same manner as described above and correction is performed thereafter. Consequently, the demarcation lines 511, 512, and 570 are respectively corrected to demarcation lines 532, 533, and 571 as shown in FIG. 24. Image extraction and character string addition are carried out accordingly, and CD/DVD printing is executed in the final stage as shown in FIG. 24.

In the correction of the demarcation line 511 of the first color and the auxiliary demarcation line 570 performed in the above, correction to a geometric, doughnut shape, which is designated in advance, is performed. In this process, a method, where the demarcation line 511 of the first color is corrected to a perfect circle 532 and the corrected auxiliary demarcation line 571 is determined based on the position and size of the circle 532, may be employed. Or a method, where the hand-drawn auxiliary demarcation line 570 is corrected to a perfect circle 571 and the corrected demarcation line 532 of the first color is determined based on the position and size of the circle 571, may be employed.

Figure 26:
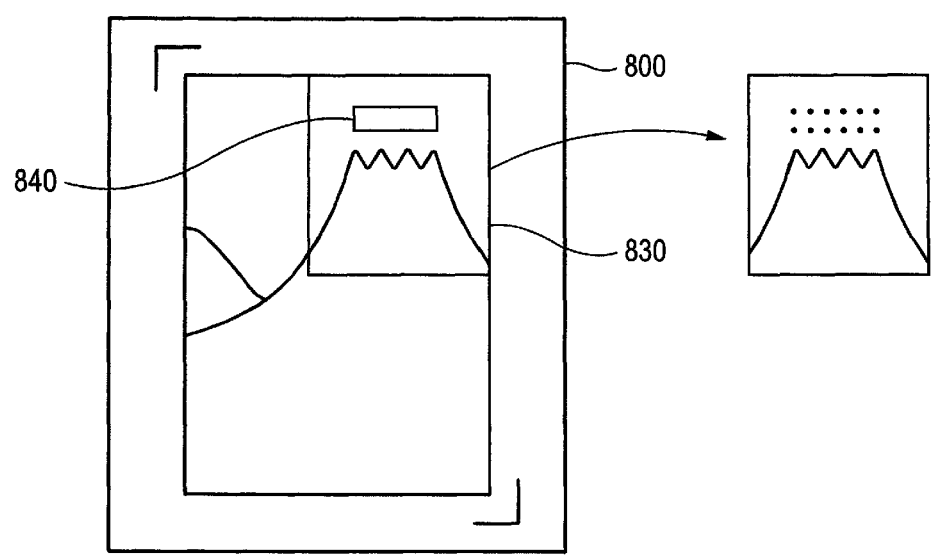

A modified example of postcard printing of the second and the third embodiments shall now be described. Using writing tools, a user hand-draws a demarcation line 811 of the first color (red) and a demarcation line 812 of the second color (blue) on an A4-size printing sheet 800 on which an original image has been draft printed in a region 803. Furthermore, the user may draw a demarcation line 813 of a third color (green). Incidentally, although printing of an outer perimeter line of the region 803 can be arbitrarily set, the outer perimeter line of the region 803 is printed in this modified example. In this modified example, the user may make use of the outer perimeter line of the region 803 in which the original image has been draft printed as a part of the demarcation line 811 of the first color (red). Incidentally, as with the second embodiment, a circumscribing rectangle can be determined if at least two demarcation lines 811 (red) are adjacent with each other. Consequently, a demarcation line comprises the demarcation line 811 (red) and the outer perimeter line of the region 803 is extracted and corrected in the procedure S300, and corrected to a demarcation line 830 as shown in FIG. 26. Further, the demarcation line 812 (blue) is corrected to a demarcation line 840 as shown in FIG. 26 is performed. Consequently, the postcard printing is completed as shown in FIG. 26.

What is claimed is:

1. An image processing apparatus comprising:
   an image reading unit that reads an image, the image comprising an image printed on a printing sheet, a first demarcation line added by a writing tool demarcating a region of the image, and a second demarcation line added by a writing tool demarcating a sub-region located inside the region demarcated by the first demarcation line;
   a demarcation line extracting unit that extracts the first demarcation line and the second demarcation line demarcating the sub-region located inside the region demarcated by the first demarcation line from the image read by the image reading unit; and
   an image extracting unit that extracts the region of the image demarcated by the first demarcation line from the image as an extracted image.

2. The image processing apparatus according to claim 1, wherein the image reading unit comprises a scanner unit.

3. The image processing apparatus according to claim 1, further comprising:
   a storage unit that stores a planar figure; and
   a correcting unit that corrects the first demarcation line extracted by the demarcation line extracting unit to a shape of the planar figure stored in the storage unit.

4. The image processing apparatus according to claim 3, wherein the planar figure comprises an outer shape of a printing medium, and
   wherein the correcting unit corrects the first demarcation line to the outer shape of the printing medium.

5. The image processing apparatus according to claim 1, further comprising:

a character string adding unit that adds a character string to the extracted image by positioning the character string inside the sub-region.

6. The image processing apparatus according to claim 1, wherein the first demarcation line and the second demarcation line are formed of lines of different colors, respectively.

7. An image processing apparatus comprising:
a first storage unit that stores image information;
an original image printing unit that prints the image information stored in the first storage unit as an original image onto a printing sheet;
an image reading unit that reads an image, the image comprising the original image printed by the original image printing unit, a first demarcation line added by a writing tool and demarcating a region of the original image, and a second demarcation line added by a writing tool and demarcating a sub-region located inside the region demarcated by the first demarcation line;
a demarcation line extracting unit that extracts the first demarcation line and the second demarcation line demarcating the sub-region located inside the region demarcated by the first demarcation line from the image read by the image reading unit; and
an image extracting unit that extracts the region of the image demarcated by the first demarcation line as an extracted image.

8. The image processing apparatus according to claim 7, wherein the image reading unit comprises a scanner unit.

9. The image processing apparatus according to claim 7, wherein the original image printing unit prints the original image information stored in the first storage unit onto the printing sheet by draft printing.

10. The image processing apparatus according to claim 7, wherein the original image printing unit prints the original image information stored in the first storage unit onto the printing sheet by monochrome printing.

11. The image processing apparatus according to claim 7, further comprising:
a second storage unit that stores a planar figure; and
a correcting unit that corrects the first demarcation line extracted by the demarcation line extracting unit to a shape of the planar figure stored in the second storage unit.

12. The image processing apparatus according to claim 11, wherein the planar figure is an outer shape of a printing medium, and
wherein the correcting unit corrects the first demarcation line to the outer shape of the printing medium.

13. The image processing apparatus according to claim 7, further comprising:
a character string adding unit that adds a character string to the extracted image by positioning the character string inside the sub-region.

14. The image processing apparatus according to claim 7, wherein the first demarcation line and the second demarcation line are formed of lines of different colors, respectively.

15. A printing apparatus comprising:
a printing unit; and
an image processing apparatus, the image processing apparatus comprising:
a first storage unit that stores image information;
an original image printing unit that prints the image information stored in the first storage unit as an original image onto a printing sheet;
an image reading unit that reads an image, the image comprising the original image printed by the original image printing unit, a first demarcation line added by a writing tool and demarcating a region of the original image, and a second demarcation line added by a writing tool and demarcating a sub-region located inside the region demarcated by the first demarcation line;
a demarcation line extracting unit that extracts the first demarcation line and the second demarcation line demarcating the sub-region located inside the region demarcated by the first demarcation line from the image; and
an image extracting unit that extracts the region of the image demarcated by the first demarcation line from the image as an extracted image,
wherein the printing unit prints the extracted image extracted by the image processing apparatus onto a printing medium.

16. An image processing method comprising:
printing image information as an original image onto a printing sheet;
reading an image, the image comprising the printed original image, a first demarcation line added by a writing tool and demarcating a region of the original image, a second demarcation line added by a writing tool and demarcating a sub-region located inside the region demarcated by the first demarcation line;
extracting the first demarcation line and the second demarcation line demarcating the sub-region located inside the region demarcated by the first demarcation line from the read image; and
extracting the region demarcated by the first demarcation line from the read image.

* * * * *